US007381882B2

(12) United States Patent
Usa

(10) Patent No.: US 7,381,882 B2
(45) Date of Patent: Jun. 3, 2008

(54) PERFORMANCE CONTROL APPARATUS AND STORAGE MEDIUM

(75) Inventor: Satoshi Usa, Hamamatsu-shi (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 11/686,471

(22) Filed: Mar. 15, 2007

(65) Prior Publication Data

US 2007/0214943 A1 Sep. 20, 2007

(30) Foreign Application Priority Data

Mar. 16, 2006 (JP) ............................ 2006-073062

(51) Int. Cl.
*G01F 3/00* (2006.01)
*G10H 1/02* (2006.01)
*G10H 7/00* (2006.01)

(52) U.S. Cl. ............................ 84/626; 84/601; 84/609; 84/612; 84/622; 84/633

(58) Field of Classification Search ..................... None
See application file for complete search history.

(56) References Cited

FOREIGN PATENT DOCUMENTS

| | | |
|---|---|---|
| JP | 10-222163 | 8/1998 |
| JP | 2000-276141 | 10/2000 |
| JP | 2002-328676 | 11/2002 |

*Primary Examiner*—Marlon T Fletcher
(74) *Attorney, Agent, or Firm*—Harness Dickey & Pierce P.L.C.

(57) ABSTRACT

A performance control apparatus which can reflect operations carried out by a user on variations in dynamics in real time to achieve performance expressions such as crescendo and decrescendo. A keyboard generates performance timing information in response to performance operations by a user, and performance intensity information. An HDD stores data of a music piece. The data of the music piece is read out from the HDD at a tempo based on the performance timing, and sounding instruction data including information on intensities and volumes of musical tones is generated. If the performance timing coincides with timing in which note information on a musical tone is read out, the sounding instruction data on the musical tone is determined based on the performance intensity information and the volume and intensity of the musical tone included in the read note information. If the performance timing is during sounding of a musical tone based on the note information previously read out, the sounding instruction data is redetermined based on the volume information on the musical tone based on the performance intensity information in the performance timing.

5 Claims, 5 Drawing Sheets

PERFORMANCE CONTROL APPARATUS AND STORAGE MEDIUM

BACKGROUND OF THE INVENTION

1. Field of the Invention

The present invention relates to a performance control apparatus that sequences data of a music piece for a predetermined duration according to operation by a performer, as well as a storage medium for the performance control apparatus.

2. Description of the Related Art

Conventionally, there have been known electronic musical instruments that generate musical tones in response to operation by a performer. Such electronic musical instruments are modeled on, for example, pianos and generally carry out performance operations in a manner similar to pianos that are acoustic musical instruments. These electronic musical instruments require skill to perform and much time to learn.

In recent years, however, realization of musical instruments that can played with ease by unskilled persons has been desired, and for example, an electronic musical instrument disclosed in Japanese Laid-Open Patent Publication (Kokai) No. 2000-276141 (Prior Art 1) has been proposed. The electronic musical instrument of Prior Art 1 is configured to carry out automatic performance to sound musical tones of certain duration (for example, about a half measure) in response to a simple operation (for example, shake by hand) by a performer. The electronic musical instrument of Prior Art 1 is comprised of a plurality of slave units and one master unit.

Such an electronic musical instrument generates musical tones in accordance with operation by a performer. Specifically, when a performer carries out a performance operation using operators, information indicative of the intensity of the performance operation (hereafter referred to as “beat velocity” in this specification) is transferred from one of the slave units to the master unit. The master unit reads out musical tone data of a part assigned to the slave unit and determines, for example, the tone color of musical tones based on the above-mentioned beat velocity and intensity information (hereafter referred to as “musical tone velocity”) written in advance in the musical tone data. The master unit also determines the volume of the musical tones based on volume information written in advance in the musical tone data and sounds the musical tones. It should be noted that electronic musical instruments are generally equipped with an operator (such as a volume slider) for a performer to designate the volume so that musical tones can be sounded with consideration given to the volume designated using the operator.

In the electronic musical instrument of Prior Art 1, once a performer has carried out a performance operation, musical tones of certain duration (for example, about a half measure) are automatically sounded with a tone color determined by this operation. The volume of the musical tones being sounded is determined based on information written in musical tone data. Once sounding of musical tones has been started, the volume thereof is not changed whatever operations a performer carries out. For this reason, it has been impossible to achieve performance expressions such as a gradual increase in tone intensity (crescendo) and a gradual decrease in tone intensity (decrescendo).

To realize increase and decrease in tone intensity, an automatic performance apparatus that can apply performance expressions such as crescendo and decrescendo to a given part of musical tone data has been proposed (Prior Art 2) (see Japanese Laid-Open Patent Publication (Kokai) No. H10-222163, for example). Also, an electronic musical instrument that enables designation of the volume of subpart data by operation of performance operators has been proposed (Prior Art 3) (see Japanese Laid-Open Patent Publication (Kokai) No. 2002-328676, for example).

The automatic performance apparatus of Prior Art 2 is capable of editing musical tone data and changing the velocity (here, musical tone velocity) according to the curve of variations in the volume of musical tones as a whole. Thus, the automatic performance apparatus of Prior Art 2 cannot control the dynamics (volume) of musical tones in real time based on beat velocities designated through operation by a performer.

Also, the electronic musical instrument of Prior Art 3 is capable of changing the volume of a subpart in real time through operation by a performer. However, for example, the electronic musical instrument is not capable of changing the volume of a prolonged musical tone of a main part, that has once been sounded even when the performer carries out an operation during sounding of the musical tone. Thus, as is the case with the automatic performance apparatus of Prior Art 2 mentioned above, the electronic musical instrument of Prior Art 3 cannot control the dynamics (volume) of musical tones in real time based on beat velocities designated through operation by a performer and cannot achieve performance expressions such as crescendo and decrescendo.

SUMMARY OF THE INVENTION

The present invention provides a performance control apparatus that can reflect operations carried out by performers on variations in dynamics in real time to achieve performance expressions such as crescendo and decrescendo, as well as a storage medium for the performance control apparatus.

In a first aspect of the present invention, there is provided a performance control apparatus comprising a performance operator adapted to generate performance timing information indicative of performance timing in automatic performance in response to performance operations by a user, and performance intensity information indicative of intensities of the performance operations, a storage device adapted to store the data of a music piece comprising sequence data of note information including volumes and intensities of musical tones, and a performance control device adapted to read out the data of the music piece from the storage device at a tempo based on the information indicative of the performance timing and to generate sounding instruction data including information on volumes and intensities of musical tones, wherein, in a case where the performance timing coincides with timing in which the note information on a musical tone is read out, the performance control device adapted to determine the sounding instruction data on the musical tone based on the performance intensity information in the performance timing and the volume and intensity of the musical tone included in the read note information, and in a case where the performance timing is during sounding of a musical tone based on the note information previously read out, the performance control device redetermines the sounding instruction data based on the volume information on the musical tone based on the performance intensity information in the performance timing.

According to the present invention, even when a musical tone is being sounded, an operation carried out by the performer can be reflected on variations in dynamics in real time, and thus, performance expressions such as crescendo and decrescendo can be achieved.

With the above arrangement, when a performer carries out a performance operation (for example, key depression), an operation signal responsive to the intensity of the performance operation can be generated. Here, the intensity of the performance operation means the beat velocity (that is, the intensity of key depression). A performer depresses a key or keys in performance timing. The performance timing is indicated at regular time intervals, e.g. at intervals of one beat, two beats, and a half beat through direction by a facilitator who serves as a guide. The performance control apparatus determines the volume and intensity of a musical tone (mainly those related to tone quality) based on a beat velocity and data of a music piece (for example, MIDI data). The performance control apparatus determines the tone color of a musical tone based on a beat velocity transmitted from a performance terminal and a musical tone velocity included in data of a music piece and also determines the volume of the musical tone based on the beat velocity and volume information included in the data of the music piece. In the case where the performance timing is indicated at intervals of one beat and the duration of a sounded musical is two beats, the volume in sounding instruction data is updated based on a beat velocity input by key depression at the second beat. Thus, even when a prolonged musical tone (for example, a half note) is being sounded, if a performer increases the intensity of key depression so as to change dynamics, the intensity of key depression is reflected on the volume of the musical tone in real time, so that a performance expression of crescendo can be achieved.

The performance control apparatus can further comprise a volume designating element adapted to generate volume designating information in response to a volume designating operation by the user, and wherein, in a case where the performance timing does not coincide with timing in which the note information on a musical tone is read out, the performance control device is adapted to determine the sounding instruction data on the musical tone based on the volume designating information and the volume and intensity of the musical tone included in the read note information.

With the above arrangement, when a performer carries out a volume designating operation using the volume designating element (such as a volume pedal), volume designating information corresponding to the volume designation value can be generated. Here, if the performance timing is indicated at intervals of one beat and a musical tone is sounded between the performance timings (for example, two eighth notes are sounded), the volume of the musical tone is determined based on an already input beat velocity, present volume designating information, and volume information included in data of a music piece.

In a second aspect of the present invention, there is provided a performance control apparatus comprising a performance operator adapted to generate performance timing information indicative of performance timing in automatic performance in response to performance operations by a user, and performance intensity information indicative of intensities of the performance operations, a volume designating element adapted to generate volume designating information in response to a volume designating operation by the user, a storage device adapted to store the data of a music piece comprising sequence data of note information including volumes and intensities of musical tones, and a performance control device adapted to read out the data of the music piece from the storage device at a tempo based on the information indicative of the performance timing and to generate sounding instruction data including information on volumes and intensities of musical tones, wherein, in a case where the performance timing coincides with timing in which the note information on a musical tone is read out, the performance control device is adapted to determine the sounding instruction data on the musical tone based on performance intensity information, and the volume designating information in the performance timing, and the volume and intensity of the musical tone included in the read note information, and in a case where the performance timing does not coincide with timing in which the note information on a musical tone is read out, the performance control device is adapted to determine the sounding instruction data on the musical tone based on the volume designating information and the volume and intensity of the musical tone included in the read note information.

With the above arrangement, when the performer carries out a performance operation using the performance operators, an operation signal responsive to the intensity of the performance operation can be generated. Also, when the performer carries out a volume designating operation using the volume designating element, volume designating information corresponding to the volume designation value can be generated. Here, the intensity of the performance operation means the beat velocity. The performer depresses a key or keys in performance timing. The performance timing is indicated at regular time intervals, e.g. at intervals of one beat, two beats, and a half beat through direction by a facilitator who serves as a guide. The performance control apparatus determines the volume and intensity of a musical tone (mainly those related to tone quality) based on a beat velocity, volume designating information, and data of a music piece (for example, MIDI data). Here, if the performance timings are indicated at intervals of one beat and musical tones are sounded between the two performance timings (for example, two eighth notes are sounded), the volume of the musical tone is determined based on an already input beat velocity, present volume designating information, and volume information included in data of a music piece.

In a third aspect of the present invention, there is provided a computer-readable storage medium including a program for causing a musical performance control apparatus, comprising a performance operator adapted to generate performance timing information indicative of performance timing in automatic performance in response to performance operations by a user, and performance intensity information indicative of intensities of the performance operations, and storage device adapted to store the data of a music piece comprising sequence data of note information including volumes and intensities of musical tones, to execute a performance control module of reading out the data of the music piece from the storage device at a tempo based on the information indicative of the performance timing and generating sounding instruction data including information on volumes and intensities of musical tones, a determination module of, in a case where the performance timing coincides with timing in which the note information on a musical tone is read out, determining the sounding instruction data on the musical tone based on the performance intensity information in the performance timing and the volume and intensity of the musical tone included in the read note information; and a redetermination module of, in a case where the performance timing is during sounding of a musical tone in accordance with based on the note information previously read out, redetermining the sounding instruction data based on the volume information on the musical tone based on the performance intensity information in the performance timing.

The performance control apparatus can further comprise a volume designating element adapted to generate volume designating information in response to a volume designating operation by the user, and the program can further cause the performance control apparatus to execute a reading time determining module of, in a case where the performance timing does not coincide with timing in which the note information on a musical tone is read out, determining the sounding instruction data on the musical tone based on the volume designating information and the volume and intensity of the musical tone included in the read note information.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
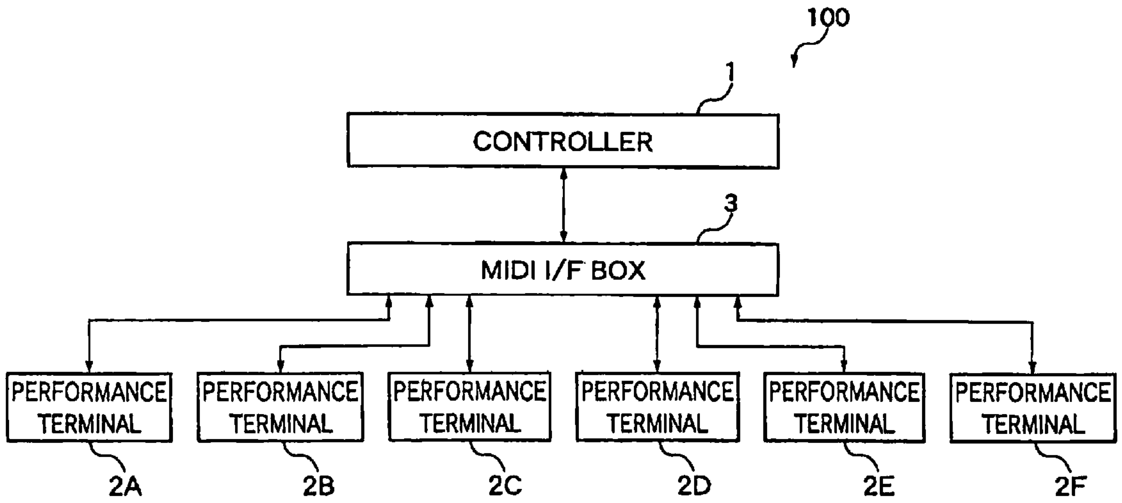
FIG. 1 is a block diagram showing the construction of an ensemble system including a controller as a performance control apparatus according to an embodiment of the present invention.

FIG. 1 is a block diagram showing the construction of an ensemble system including a controller as a performance control apparatus according to an embodiment of the present invention. This ensemble system 100 is comprised of the controller 1, and a plurality of (six in FIG. 1) performance terminals 2 (2A to 2F) connected to the controller 1 via a MIDI interface box 3. In the present embodiment, the performance terminals 2 are connected to the controller 1 in different MIDI channels since the connection is via the MIDI interface box 3. It should be noted that the MIDI interface box 3 is connected to the controller 1 via a USB.

In the ensemble system 100 according to the present embodiment, the performance terminals 2 automatically perform different performance parts under control of the controller 1, so that ensemble is performed. Performance parts are melodies or the like constituting the same ensemble composition. Examples of performance part include one or a plurality of melody parts, a rhythm part, and a plurality of accompaniment parts to be performed by different musical instruments.

In the ensemble system 100, each performance terminal 2 does not completely perform automatic performance, but volume, intensity, timing, tempo, and so on are designated through a performance operation by a performer of each performance terminal 2 with respect to data of each performance part of a predetermined duration (for example, data of a half measure). In the ensemble system 100, ensemble can be performed in suitable performance timing when performers carry out performance operations in designated operation timing.

The operation timing may be common to the performance terminals 2, or, for example, may be indicated to each performer through performance operations by a facilitator who serves as a guide (for example, a performer who plays the performance terminal 2A) or through direction using hands or the like. When the performers carry out performance operations in operation timing thus indicated, suitable ensemble is performed.

The performance terminals 2 are implemented by electronic keyboard instruments such as electronic pianos. The performance terminals 2 accept performance operations carried out by the performers (for example, depression of any one key of a keyboard). Also, the performance terminals 2 are each equipped with an operator for volume designation such as a volume pedal to accept a volume designating operation carried out by the performer. The performance terminals 2 each have a function of communicating with the controller 1 and transmit an operation signal indicative of a performance operation and a volume designating operation to the controller 1. This operation signal includes information indicative of the key depression intensity (i.e. beat velocity), the designated volume, and so on.

The performance terminals 2 are each equipped with a plurality of keys (operators) since they are implemented by electronic keyboard musical instruments. Although the operation signal includes not only information indicative of the key depression intensity and others but also information indicative of the tone pitch, the controller 1 according to the present embodiment ignores the information indicative of the tone pitch and uses the operation signal as a signal indicative of the key depression intensity and the timing of performance operation. For this reason, if different keys are depressed, the same operation signal is transmitted to the controller 1 insofar as they are depressed at the same intensity. Thus, the performers can perform merely by depressing any one key even if they are unskilled in performance.

The controller 1, which is implemented by, for example, a personal computer, controls performance operations of the performance terminals 2 with software installed in the personal computer. Specifically, the controller 1 stores data of a music piece comprised of a plurality of performance parts. Volumes, intensities (musical tone velocity), durations, etc. of musical tones to be sounded are written in the data of the music piece. The controller 1 assigns any of the performance parts (or a plurality of performance parts) to each of the performance terminals 2 in advance before ensemble.

The controller 1 has a function of communicating with the performance terminals 2. When an operation signal indicative of a performance operation is input from any performance terminal 2 to the controller 1, the controller 1 sequences data of a music piece for a predetermined duration in a performance part assigned to the performance terminal 2 and transmits the sequenced data of the music piece as sounding instruction data to the performance terminal 2. The sounding instruction data includes sounding timing, duration, volume, tone color, effects, variation in pitch (pitch bend), tempo, etc.

The performance terminals 2 carry out automatic performance of performance parts in accordance with sounding instruction data using built-in tone generators. Thus, the performance terminals 2 carry out performance of performance parts assigned thereto by the controller 1 at intensities designated through performance operations by the respective performers, and as a consequence, ensemble is performed. It should be noted that the performance terminals 2 should not necessarily be implemented by electronic pianos, but may be implemented by other electronic musical instruments such as electronic guitars. It is quite a matter of course that the performance terminals 2 should not necessarily look like acoustic musical instruments but may be terminals equipped with operators such as buttons.

It should be noted that the performance terminal 2 should not necessarily have tone generators incorporated therein, but independent tone generators for the performance terminals 2 may be connected to the controller 1. In this case, the number of tone generators connected to the controller 1 may be one or the same as the number of performance terminals 2. If tone generators as many as performance terminals 2 are connected to the controller 1, the controller 1 may associate the tone generators with the respective performance terminals 2 and assign parts of data of a music piece to the performance terminals 2.

Next, a description will be given of the constructions of the controller 1 and the performance terminals 2.

Figure 2:
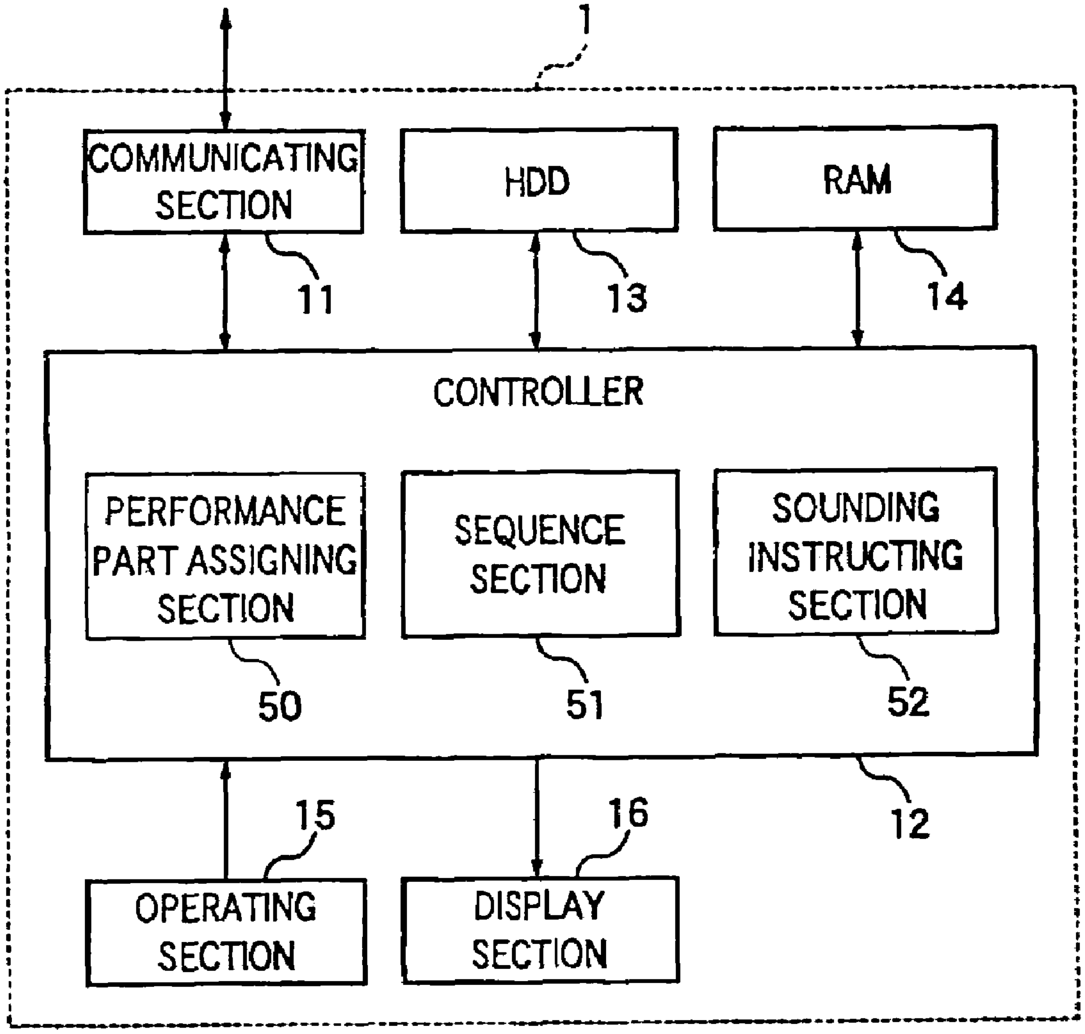
FIG. 2 is a block diagram showing the construction of the controller appearing in FIG. 1.

FIG. 2 is a block diagram showing the construction of the controller 1 appearing in FIG. 1. As shown in FIG. 2, the controller 1 is equipped with a communicating section 11, a control section 12, an HDD 13, a RAM 14, an operating section 15, and a display section 16. The communicating section 11, HDD 13, RAM 14, operating section 15, and display section 16 are connected to the control section 12.

The communicating section 11 is a circuit section that communicates with the performance terminals 2 and has a USB interface. The MIDI interface box 3 is connected to the USB interface, and the communicating section 11 communicates with the six performance terminals 2 via the MIDI interface box 3 and MIDI cables. The HDD 13 stores programs for operation of the controller 1 and data of a music piece comprised of a plurality of parts.

The controller 12 reads out operation programs stored in the HDD 13 and loads them into the RAM 14, which serves as a work memory, to realize functional components such as a performance part assigning section 50, a sequence section 51, and a sounding instructing section 52. The performance part assigning section 50 assigns performance parts of data of a music piece to the performance terminals 2. The sequence section 51 sequences performance parts of data of a music piece (determines volumes, tone colors, etc. of tones) in accordance with operation signals received from the performance terminals 2. The sounding instructing section 52 transmits volumes, tone colors, etc. of tones determined by the sequence section 51 as sounding instruction data to the performance terminals 2.

The operating section 15 is for a performer (mainly a facilitator) to give instructions as to operation of the present performance system. The facilitator operates the operating section 15 to, for example, designate data of a music piece to be performed and assigns performance parts to the performance terminals 2. The display section 16 is a so-called display (monitor), and the facilitator and each performer carry out performance operations while looking at the display section 16. The display section 16 displays, for example, performance timing for performing ensemble.

Figure 3:
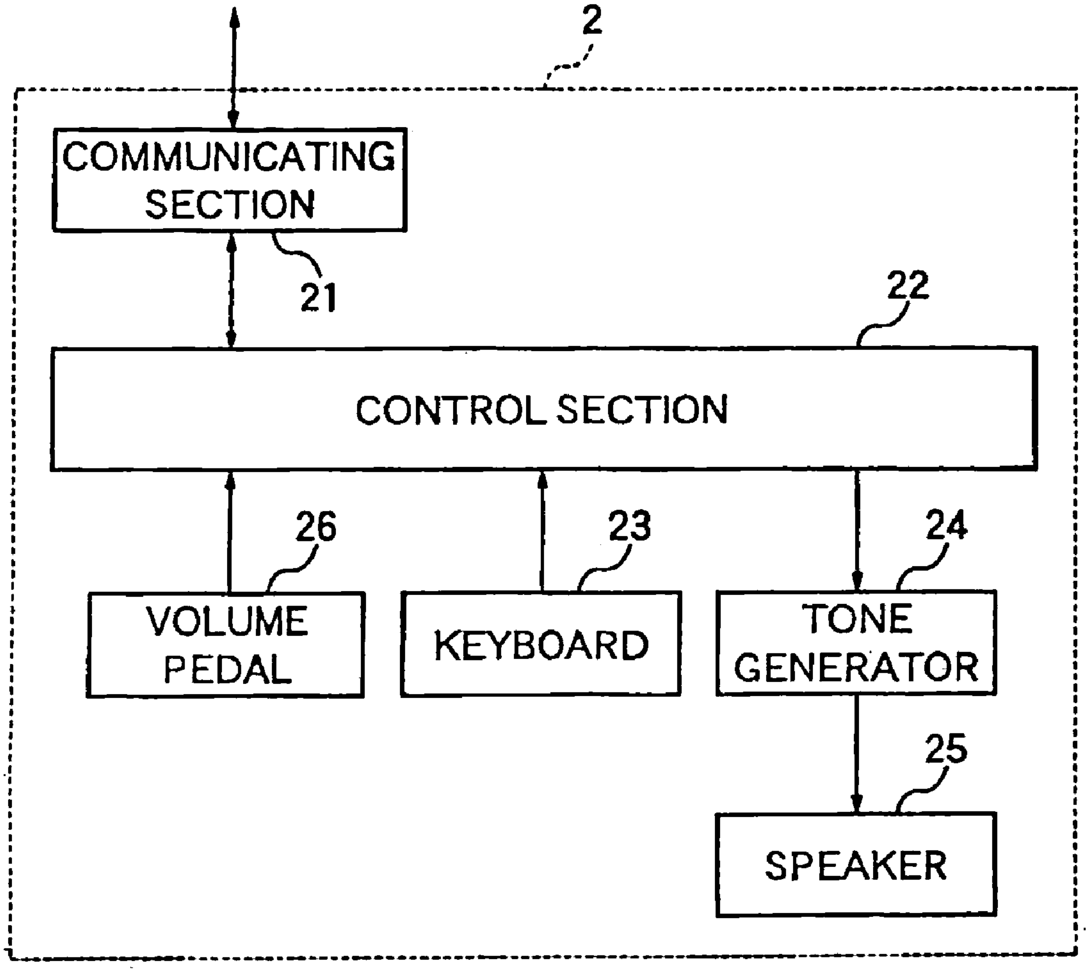
FIG. 3 is a block diagram showing the construction of a performance terminal appearing in FIG. 1.

FIG. 3 is a block diagram showing the construction of the performance terminal 2 appearing in FIG. 2. As shown in FIG. 3, the performance terminal 2 is equipped with a communicating section 21, a control section 22, a keyboard 23 comprised of performance operators, a tone generator 24, a speaker 25, and a volume pedal 26. The communicating section 21, keyboard 23, tone generator 24, and volume pedal 26 are connected to the control section 22. The speaker 25 is connected to the tone generator 24.

The communicating section 21 is implemented by a MIDI interface, which communicates with the controller 1 via a MIDI cable. The control section 22 controls the overall operation of the performance terminal 2. The keyboard 23 is comprised of, for example, 61 keys or 88 keys to carry out performance in the range of five to seven octaves. In the ensemble system 100, however, note-on/note-off messages and data indicative of key depression intensities (beat velocities) are used without discriminating between keys. Specifically, each key has an ON/OFF detecting sensor and a key depression intensity detecting sensor incorporated therein. The keyboard 23 outputs an operation signal to the controller 22 in accordance with an operation of each key mode (i.e. which key has been depressed at what degree of intensity). In accordance with the input operation signal, the controller 22 transmits a note-on message, a note-off message, or the like to the controller 1 via the communicating section 21.

The volume pedal 26 is an operator for a performer to designate the volume and outputs a volume designating signal responsive to the amount of pedal depression by the performer (i.e. volume designation value) to the controller 22. It should be noted that the operator for designating the volume should not necessarily be a pedal, but may be any other means such as a wheel or a slider. In accordance with the input volume designation signal, the controller 22 transmits volume designation information to the controller 1 via the communicating section 21.

The tone generator 24 generates a musical tone waveform under control of the control section 22 (i.e. sounding designation data) and outputs the musical tone waveform as a sound signal to the speaker 25. The speaker 25 reproduces the sound signal input from the tone generator 24 to sound musical tones. It should be noted that although in the present embodiment, the tone generator 24 and the speaker 25 are incorporated in the performance terminal 2, there is no intention to limit the invention to this, but an external tone generator and an external speaker may be connected to the controller 1 so that musical tones can be sounded from a place away from the performance terminal 2. In this case, tone generators as many as performance terminals 2 may be connected to the controller 1, or alternatively a single tone generator may be used.

Also, although in the present embodiment, when a key or keys of the keyboard 23 are depressed, the control section 22 transmits a note-on/note-off message to the controller 1, and instruct the tone generator 24 to sound musical tones to sound in response to an instruction from the controller 1, not in response to a note message from the keyboard 23 (local-off), it is quite a matter of course that the performance terminal 2 may alternatively be used as an ordinary electronic musical instrument. When a key or keys of the keyboard 23 are depressed, the control section 22 may instruct the tone generator 24 to sound musical tones in accordance with a note message from the keyboard 23 (local-on). A user may switch between the local-on state and the local-off state either by using the operating section 15 of the controller 1 or by using a terminal operating section, not shown, of the performance terminal 2. Also, the keyboard 23 may be programmed such that only some of the keys are in the local-on state and the rest are in the local-off state.

Conventionally, the controller 1 determines a total velocity value based on a beat velocity transmitted from the performance terminal 2 and a musical tone velocity included in data of a music piece and determines a total volume value based on a volume designation information transmitted from the performance terminal 2 and a volume value included in the data of the music piece. As a consequence, the controller 1 determines the tone color and the volume in sounding instruction data. On the other hand, according to the present embodiment, the controller 1 determines a total velocity value based on three pieces of information consisting of a beat velocity and volume designation information transmitted from the performance terminal 2 and a musical tone velocity included in data of a music piece and determines a total volume value based on three pieces of information consisting of a beat velocity and volume designation information transmitted from the performance terminal 2 and a volume value included in the data of the music piece. As a consequence, the controller 1 can determine the tone color and volume in sounding instruction data. Also, even when any tone is being sounded (for example, when a prolonged musical tone such as a half note is being sounded), if a beat velocity or volume designation information is received from the performance terminal 2, it can be reflected on sounding instruction data.

Figure 4:
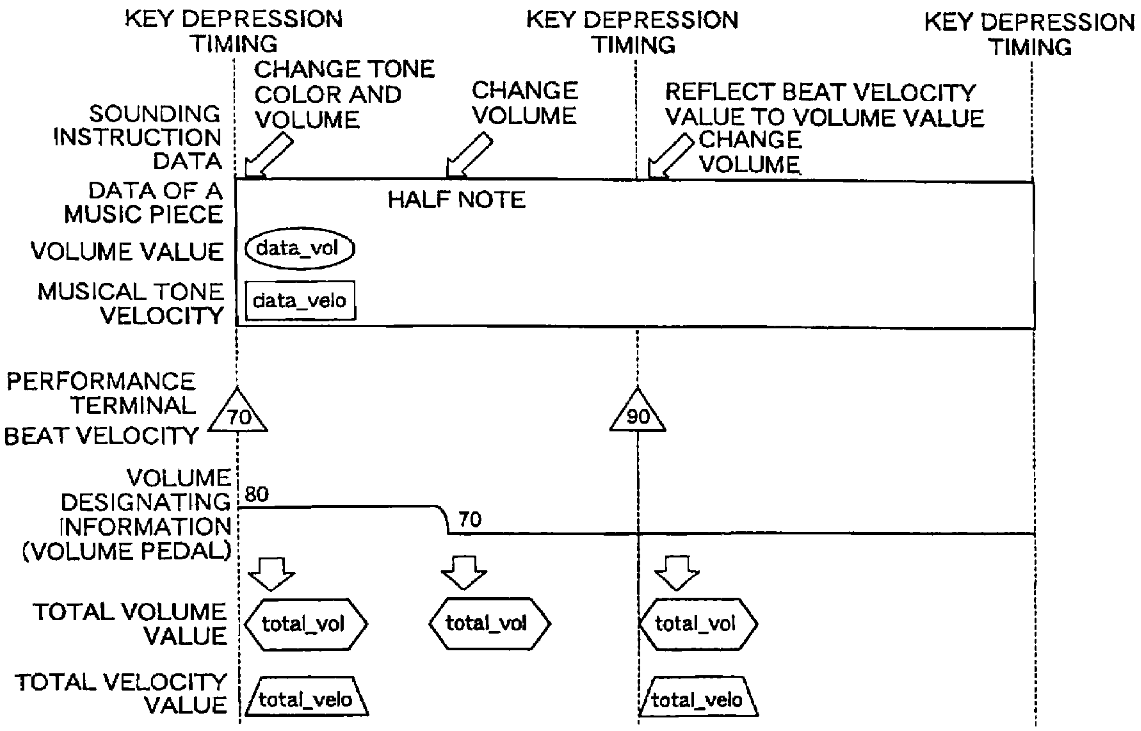
FIG. 4 is a diagram showing the relationship between data of a music piece, beat velocities input by key depressions of a performer, and volume designation values in the case where a half note is sounded by the ensemble system.
Figure 5:
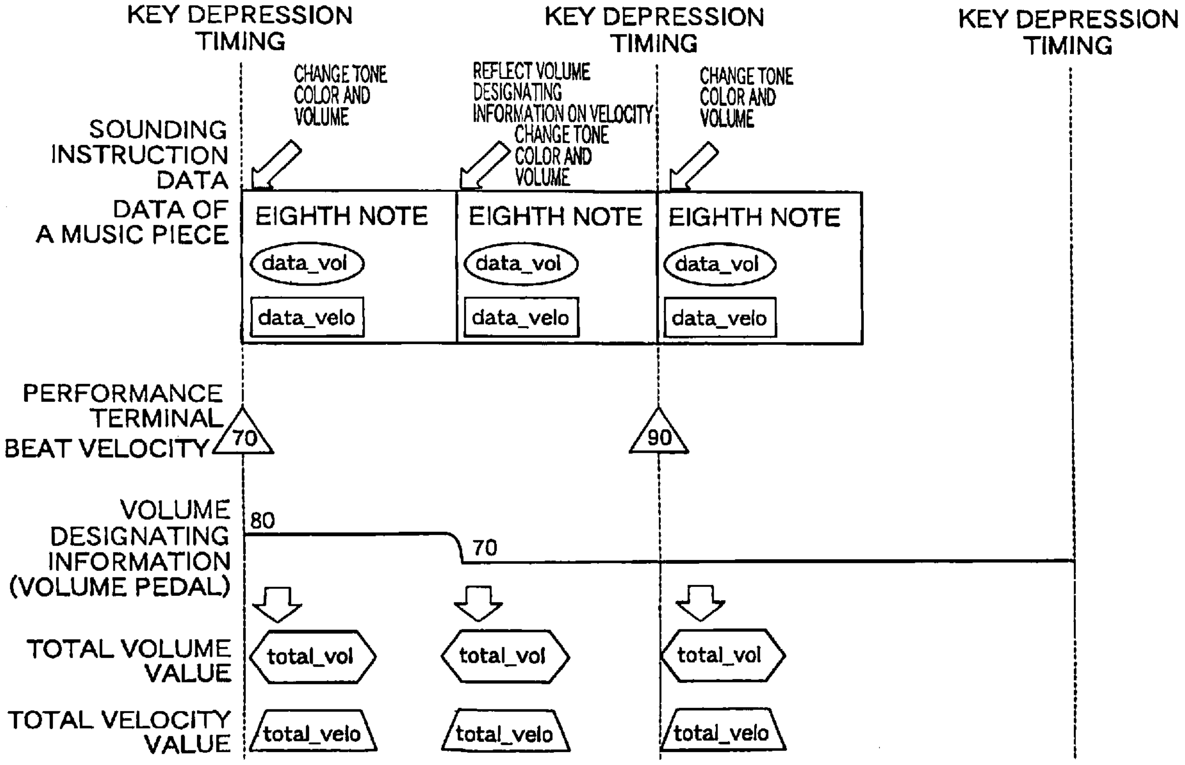
FIG. 5 is a diagram showing the relationship between data of a music piece, beat velocities input by key depressions of a performer, and volume designation values in the case where eighth notes are sounded by the ensemble system.

A description will now be given of how sounding instruction data is determined according to the present embodiment. FIGS. 4 and 5 are diagrams showing the relationship between data of a music piece, velocity of beat by a performer, and volume designation value. In these illustrated examples, it is assumed that each performer depresses one key of the keyboard 23 at intervals of one beat in response to an instruction from a facilitator. When the performer depresses a key, a signal indicative of operation by the performer is transmitted to the controller 1, so that sounding instruction data of one beat is determined and a musical tone is sounded.

FIG. 4 is a diagram showing the relationship between data of a music piece, beat velocities input by key depressions of a performer, and volume designation value in the case where a half note is sounded by the ensemble system 100. Specifically, FIG. 4 illustrates an example where a musical tone of a half note (i.e. a musical tone of two measures) is sounded in response to key depression at intervals of one beat. First, when a performer depresses a key, an operation signal including a beat velocity is transmitted to the controller 1. The velocity value assumes any of integers 0 to 127, and in the illustrated example, information indicative of a velocity value of 70 is transmitted to the controller 1. Also, volume designation information corresponding to the amount of depression of the volume pedal by the performer at that time is transmitted to the controller 1. The volume designation information also assumes any of integers 0 to 127, and in the illustrated example, volume designation information indicative of a volume value of 80 is transmitted to the controller 1. The volume designation information is transmitted independently of performance timing (key depression) when the amount of depression of the volume pedal changes. Upon receiving the operation signal, the controller 1 determines a total velocity value (total_velo) based on a musical tone velocity (data_velo) written in the data of the music piece, the beat velocity (beat_velo), and the volume designation information (pedal_vol). The total velocity value is determined using the mathematical expression 1 given below.

$$\text{total\_velo} = \text{data\_velo} \times \left(\frac{\text{beat\_velo}}{127} x_1 + \frac{\text{pedal\_vol}}{127} \times y_1 + z_1\right) \quad \text{[Mathematical Expression 1]}$$

In this mathematical expression 1, $x_1$, $y_1$, and $z_1$, represent weights on the respective values with respect to the total velocity value and are arbitrary values. However, the weight assigned to the volume designating information with respect to the total velocity value is set to be lower than the weight assigned to the beat velocity. By assigning the weight to the beat velocity with respect to the total velocity value heightened, natural variations in dynamics can be realized.

Also, the controller 1 determines a total volume value (total_vol) based on a volume value (data_vol) written in the data of the music piece, the beat velocity (beat_velo), and the volume designation information (pedal_vol). The total volume value is determined using the mathematical expression 2 given below.

$$\text{total\_vol} = \text{data\_vol} \times \left(\frac{\text{beat\_velo}}{127} x_2 + \frac{\text{pedal\_vol}}{127} \times y_2 + z_2\right) \quad \text{[Mathematical Expression 2]}$$

In this mathematical expression 2, $x_2$, $y_2$, and $z_2$ represent weights on the respective values with respect to the total volume value and are arbitrary values. However, the weight assigned to the beat velocity with respect to the total volume value is set to be lower than the volume designating information. By assigning the weight to the volume designating information with respect to the total volume value heightened, natural variations in dynamics can be realized. The total volume value is updated each time there is a change in the volume designating information transmitted asynchronously with the performance timing. That is, the total volume value is updated either at the time of key depression or at other times. For example, assuming that the volume value (volume designating information given by depression of the volume pedal) is changed to 70 a half beat after sounding of a musical tone as shown in FIG. 5, the volume value of 70 is reflected on the total volume value. It should be noted that the total volume value is also changed even when the volume value written in the data of the music piece is changed.

In the performance timing, the tone color and volume of the musical tone of the present beat are determined based on the determined total velocity value and the determined total volume value. The controller 1 sends the determined sound instruction data to the performance terminal 2, and as a consequence, the performance terminal 2 sounds the musical tone of one beat first. It should be noted that in the illustrated example, sounding instruction data on the half note is transmitted, and hence in the performance terminal 2, sounding does not end until it receives sounding instruction data for the next beat (that is, the performance terminal 2 does not proceed to the next beat).

Next, when the performer depresses a key, an operation signal indicative of a beat velocity and volume designation information is transmitted to the controller 1 as above. In the illustrated example, information indicative of a velocity value of 90 is transmitted to the controller 1 in the second beat. Upon receiving the operation signal, the controller 1 updates the total volume value based on the beat velocity and the volume designation information which are newly input, and the volume value written in the data of the music piece that has already been read out in the previous beat. The total velocity value is updated using the above mathematical expression 1.

In the above described manner, the controller 1 updates the musical tone volume included in the sounding instruction data and transmits the sounding instruction data to the performance terminal 2 again. Based on the received sounding instruction data, the performance terminal 2 changes the volume of the musical tone of the half note being sounded. Since the controller 1 has transmitted the sounding instruction data on the half note of the first beat, the pitch and the like of the musical tone being sounded by the performance terminal 2 are not changed, but the volume of the musical tone is changed. Thus, the performer can achieve performance expressions such as crescendo and decrescendo.

FIG. 5 is a diagram showing the relationship between data of a music piece, beat velocities input by key depressions of a performer, and volume designation values in the case where eighth notes are sounded by the ensemble system 100. Specifically, FIG. 5 illustrates an example where a musical tone of an eighth note (i.e. a musical tone of a half measure) is sounded in response to key depression at intervals of one beat. First, when a performer depresses a key, an operation signal including a beat velocity is transmitted to the controller 1. In the illustrated example, information indicative of a velocity value of 70 is transmitted to the controller 1. Also, volume designation information corresponding to the amount of depression of the volume pedal by the performer at that time is transmitted to the controller 1. In the illustrated example, volume designation information indicative of a volume value of 80 is transmitted to the controller 1. Upon receiving the operation signal, the controller 1 determines a total velocity value based on a musical tone velocity written in the data of the music piece, the beat velocity, and the volume designation information. In the illustrated example, since it is written in the data of the music piece that two eighth notes are sounded within one measure, the total velocity value is determined with respect to each of these eighth notes to be sounded. The total velocity value is determined using the above mathematical expression 1.

Also, the controller 1 determines a total volume value based on a volume value written in the data of the music piece, the beat velocity, and the volume designation information. The total velocity value is determined using the above mathematical expression 2. In the example illustrated in FIG. 5, since it is written in the data of the music piece that two eighth notes are sounded within one measure, the total volume value is determined with respect to each of these eighth notes to be sounded. The tone color and volume of a musical tone corresponding to each eighth note in the present beat are then determined based on the determined total velocity value and total volume value. The controller 1 sends the determined sounding instruction data to the performance terminal 2. As a consequence, a musical tone corresponding to the first eighth note in the two eighth notes of one beat is sounded by the performance terminal 2 first, and then a musical tone corresponding to the second eighth note is sounded.

Here, when a new musical tone is sounded and the volume value is changed, the total velocity value is also changed even if no key is depressed. For example, as shown in FIG. 4, when the volume value (volume designating information given by depression of the volume pedal) is changed to 70 a half beat after the musical tone is sounded, the volume value of 70 is reflected on the total volume value. The total volume value is also updated using the above mathematical expression 2. At the same time, the controller 1 updates the total velocity value based on the above volume value, a musical tone velocity written in the data of the music piece, and the beat velocity that has already been input at the time of the previous key depression. The total velocity value is also updated using the above mathematical expression 1. Based on the updated total volume value and total velocity value, the controller 1 changes the sounding instruction data of the eighth note, i.e. the second musical tone. As a consequence, the tone color and the volume are changed to those reflecting the volume designating operation by the performer.

Next, when the performer depresses a key, an operation signal indicative of a beat velocity and volume designation information is transmitted to the controller 1 as above. In the illustrated example, information indicative of a velocity value of 90 is transmitted to the controller 1 in the second beat. Upon receiving the operation signal, the controller 1 redetermines a total velocity value based on the beat velocity and the volume designation information which are newly input, and a musical tone velocity written in the data of the music piece. In the example illustrated in FIG. 4, the total velocity value is updated since the musical tone of the half note is being sounded, but in the example illustrated in FIG. 5, the total velocity value is redetermined since a musical tone of a new eighth note is sounded. The total velocity value is redetermined using the above mathematical expression 1.

Also, a total volume value is redetermined based on the beat velocity and the volume designation information which are newly input, and a volume value written in the data of the music piece. The total volume value is redetermined using the above mathematical expression 2. The tone color and volume of a musical tone corresponding to the eighth note in the present beat are then determined based on the determined total velocity value and total volume value. The controller 1 sends the determined sounding instruction data to the performance terminal 2. As a consequence, the performance terminal 2 sounds the musical tones of the above two eighth notes at intervals of one beat is sounded by the performance terminal 2.

In the above described manner, the ensemble system 100 according to the present embodiment updates a total volume value based on a beat velocity and volume designation information transmitted from the performance terminal 2 even when a musical tone is being sounded, and therefore performance expressions such as crescendo and decrescendo can be achieved. Also, even in timing other than performance timing, when a new musical tone is sounded, a total velocity value is updated based on volume designation information transmitted from the performance terminal 2 and a beat velocity that has already been input, and therefore performance expressions such as crescendo and decrescendo can be achieved.

It should be noted that although in the above described examples, it is assumed that a key is depressed at intervals of one beat, a key or keys should not necessarily be pressed every performance timing, but a key or keys may be depressed at intervals of two beats or at intervals of a half beat insofar as a key or keys are depressed at regular time intervals.

It should be noted that the tempo included in sounding instruction data may be determined based on the duration of time between a note-on and a note-off (hereinafter referred to as "gate time") or may be determined in a manner described below. The moving average of gate times is calculated with respect to a plurality of keys depressions (a plurality of key depressions up to the most recent key depression), and weights are assigned to the gate times in a time-dependent manner. The highest weight is assigned to the most recent key depression, and lower weights are assigned to older key depressions. If the tempo is determined in this manner, the tempo does not abruptly change even when the gate time greatly changes at a certain key depression, and thus, the tempo can change naturally in accordance with the progress of a musical composition.

It should be noted that since the performance terminal 2 is instructed to continuously sound a musical tone sounded first in a measure until a note-off message is input, the performance terminal 2 (tone generator 24) continuously sounds the same musical tone until the performer newly depress a key of the keyboard 23. Thus, in the ensemble system 100, the performance expression that tones are sounded for an extended duration of time (fermata) can be achieved.

Also, if the tempo is determined by calculating the moving average of gate times in the above described manner, performance expressions described below can be achieved. For example, if a key is briefly touched at a certain key depression, the control section 12 (sequence section 51) of the controller 1 sets the duration of each tone in the present beat to a small value, and on the other hand, when a key is slowly depressed at a certain key depression, the control section 12 sets the duration of each tone in the present beat to a large value. Thus, by using the performance terminal 2, the performance expression that tones are crisply sounded without greatly changing the tempo (staccato), and the performance expression that the duration of each tone is kept long without greatly changing the tempo (tenuto) can be achieved.

It should be noted that although in the present embodiment, the same note-on/off message is transmitted to the controller 1 irrespective of which key is depressed, the keyboard 23 may include keys which enable performance in a staccato and/or tenuto manner and keys which do not enable performance in a staccato and/or tenuto manner. The controller 1 may change the tone duration while maintaining the tempo only when it receives a note-on message or a note-off message from a specific key (for example, E3).

It is to be understood that the object of the present invention may also be accomplished by supplying a computer, for example, the controller 1 with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy® disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A performance control apparatus comprising:

a performance operator adapted to generate performance timing information indicative of performance timing in automatic performance in response to performance operations by a user, and performance intensity information indicative of intensities of the performance operations;

a storage device adapted to store the data of a music piece comprising sequence data of note information including volumes and intensities of musical tones; and a performance control device adapted to read out the data of the music piece from said storage device at a tempo based on the information indicative of the performance timing and to generate sounding instruction data including information on volumes and intensities of musical tones, wherein, in a case where the performance timing coincides with timing in which the note information on a musical tone is read out, said performance control device adapted to determine the sounding instruction data on the musical tone based on the performance intensity information in the performance timing and the volume and intensity of the musical tone included in the read note information, and wherein, in a case where the performance timing is during sounding of a musical tone based on the note information previously read out, said performance control device redetermines the sounding instruction data based on the volume information on the musical tone based on the performance intensity information in the performance timing.

2. A performance control apparatus according to claim 1, further comprising a volume designating element adapted to generate volume designating information in response to a volume designating operation by the user, and wherein, in a case where the performance timing does not coincide with timing in which the note information on a musical tone is read out, said performance control device is adapted to determine the sounding instruction data on the musical tone based on the volume designating information and the volume and intensity of the musical tone included in the read note information.

3. A performance control apparatus comprising:

a performance operator adapted to generate performance timing information indicative of performance timing in automatic performance in response to performance operations by a user, and performance intensity information indicative of intensities of the performance operations;

a volume designating element adapted to generate volume designating information in response to a volume designating operation by the user;

a storage device adapted to store the data of a music piece comprising sequence data of note information including volumes and intensities of musical tones; and a performance control device adapted to read out the data of the music piece from said storage device at a tempo based on the information indicative of the performance timing and to generate sounding instruction data including information on volumes and intensities of musical tones, wherein, in a case where the performance timing coincides with timing in which the note information on a musical tone is read out, said performance control device is adapted to determine the sounding instruction data on the musical tone based on performance intensity information and the volume designating information in the performance timing, and the volume and intensity of the musical tone included in the read note information, and wherein, in a case where the performance timing does not coincide with timing in which the note information on a musical tone is read out, said performance control device is adapted to determine the sounding instruction data on the musical tone based on the volume designating information and the volume and intensity of the musical tone included in the read note information.

4. A computer-readable storage medium including a program for causing a musical performance control apparatus, comprising a performance operator adapted to generate performance timing information indicative of performance timing in automatic performance in response to, and performance intensity information indicative of intensities of the performance operations, and storage device adapted to store the data of a music piece comprising sequence data of note information including volumes and intensities of musical tones, to execute:

a performance control module of reading out the data of the music piece from the storage device at a tempo based on the information indicative of the performance timing and generating sounding instruction data including information on intensities and volumes of musical tones;

a determination module of, in a case where the performance timing coincides with timing in which the note information on a musical tone is read out, determining the sounding instruction data on the musical tone based on the performance intensity information in the performance timing and the volume and intensity of the musical tone included in the read note information; and a redetermination module of, in a case where the performance timing is during sounding of a musical tone based on the note information previously read out, redetermining the sounding instruction data based on the volume information on the musical tone based on the performance intensity information in the performance timing.

5. A computer-readable storage medium according to claim 4, wherein the performance control apparatus further comprises a volume designating element adapted to generate volume designating information in response to a volume designating operation by the user, and the program further causing the performance control apparatus to execute a reading time determining module of, in a case where the performance timing does not coincide with timing in which the note information on a musical tone is read out, determining the sounding instruction data on the musical tone based on the volume designating information and the volume and intensity of the musical tone included in the read note information.

* * * * *